(12) United States Patent
Dhalla et al.

(10) Patent No.: US 6,806,820 B1
(45) Date of Patent: Oct. 19, 2004

(54) ANALOG RECONSTRUCTION OF A DIGITAL SIGNAL

(75) Inventors: Cyrus Asafandiar Dhalla, Redondo Beach, CA (US); Michael Steven Muñoz, Redondo Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/428,260

(22) Filed: May 2, 2003

(51) Int. Cl.[7] .................................................. H03M 1/66
(52) U.S. Cl. ..................... 341/144; 341/143; 341/118; 341/110
(58) Field of Search .............................. 341/118, 143, 341/144, 110; 375/247, 324, 340, 297, 296, 222, 240; 381/314, 316, 317

(56) References Cited

U.S. PATENT DOCUMENTS

| | | | |
|---|---|---|---|
| 4,067,011 A | | 1/1978 | Althaus |
| 5,535,240 A | | 7/1996 | Carney et al. |
| 5,732,189 A | | 3/1998 | Johnston et al. |
| 5,754,942 A | | 5/1998 | Wachs |
| 5,872,531 A | * | 2/1999 | Johnson et al. ............. 341/110 |
| 6,173,011 B1 | | 1/2001 | Rey et al. |
| 6,215,430 B1 | * | 4/2001 | Smith et al. ................ 341/144 |
| 6,218,972 B1 | * | 4/2001 | Groshong ................... 341/143 |
| 6,236,731 B1 | | 5/2001 | Brennan et al. |
| 6,298,097 B1 | * | 10/2001 | Shalom ....................... 375/297 |
| 6,507,303 B1 | * | 1/2003 | Alelyunas et al. .......... 341/144 |
| 6,515,605 B2 | * | 2/2003 | Panasik et al. ............. 341/143 |
| 6,606,391 B2 | * | 8/2003 | Brennan et al. ............ 381/316 |

OTHER PUBLICATIONS

Stasinski, R., "Efficient Implementation of Uniform Filter Bank in the Absence of Critical Sampling," Electronic Letters, vol. 30, No. 2, Jan. 20, 1994.
Cvetkovic, Z.; Vetterli, M., "Oversampled Filter Banks", IEEE Trans. Signal Processing, vol. 46 No. 5, May 1998.
Weiss, S., Stwart, R.W., "Fast Implementation of Oversampled Modulated Filter Banks," Electronics Letters, vol. 36, No. 17, Aug. 2000.

* cited by examiner

Primary Examiner—Michael Tokar
Assistant Examiner—Linh V Nguyen
(74) Attorney, Agent, or Firm—Tarolli, Sundheim, Covell & Tummino, L.L.P.

(57) ABSTRACT

A system and method is provided for efficient analog reconstruction of a digital signal to an intermediate frequency (IF). The digital signal can be a complex baseband digital signal that is sourced from a near perfect reconstruction filterbank (NPRFB). The output of the NPRFB, after some manipulation in the digital domain, is converted to the analog domain at IF. The IF analog signal can then be modulated with a high frequency RF signal or further mixed with a RF transmission frequency signal for RF transmission.

25 Claims, 6 Drawing Sheets

ANALOG RECONSTRUCTION OF A DIGITAL SIGNAL

TECHNICAL FIELD

The present invention relates generally to communications, and more particularly to a system and method for analog reconstruction of a digital signal.

BACKGROUND OF THE INVENTION

Filterbanks have been employed in many applications such as transmultiplexers, audio/video compression, and adaptive filtering. A typical reconstruction filterbank (e.g., near perfect reconstruction filterbank) is designed to filter a wide band digital signal comprised of a plurality of sub-bands or subchannels into the subbands or subchannels (e.g., channelize the wideband signal), process the subbands or subchannels (e.g., compress/decompress), and then reconstruct the subbands or subchannels (e.g., reconstructing or synthesizing the subbands) into a wide band digital signal with an attempt to minimize alias distortion. Oversampled filterbanks are widely employed to reduce the computational complexity of signal processing algorithms, such as subband adaptive filtering techniques utilized in many audio/video compression techniques. The signal channelizing and synthesizing is typical performed employing algorithms executed on a digital signal processor.

Filterbanks are employed in wireless applications for separating channels of a wideband signal and for reconstructing the channels at similar or different frequency bands into a wideband signal prior to transmission of the wideband signal over a wireless link. After the signal channeling and signal combining algorithms are performed, the wideband signal is typically transmitted over a radio frequency (RF) wireless link to one or more other radio devices (e.g., user terminals). The transmission frequency of the RF wireless link is at a substantially higher frequency than the processing frequency of the wideband signal. Therefore, the wideband signal is converted from the digital domain to the analog domain and mixed with an intermediate frequency source to provide a wideband analog signal at the higher transmission frequency.

Conventional methods of converting a digital complex baseband output of a reconstruction filterbank into the analog domain employ a digital-to-analog converter (DAC). The output of the DAC is then provided to an analog mixer to frequency shift the analog signal to an intermediate frequency. The analog signal at the intermediate frequency can then be provided to an RF carrier at a transmission frequency or upmixed again to the RF transmission frequency. However, the frequency shifting of the analog signal adds undesired distortion to the analog signal. Additionally, a DAC is designed to have a sampling rate that provides a frequency response having a central flat region (i.e., accurate bandwidth region of the DAC) and outer non-flat regions (i.e., outside the accurate bandwidth region of the DAC). In typical systems, the digital signal provided at the input of the DAC is at a frequency that is in the non-flat frequency response region of the DAC, since the frequency of the signal is higher or lower than the accurate bandwidth region of the DAC. This causes alias distortion of the wideband output signal. The alias distortion needs to be removed prior to signal transmission.

Commonly, an "Inverse Sinc" compensation function is performed on the wideband output signal to eliminate distortion caused by the non-flat frequency response in the higher operating frequency ranges of the DAC. However, the "Inverse Sinc" compensation function increases the complexity of the system.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

The present invention includes a system and method for efficient analog reconstruction of a digital signal. The digital signal can be a complex baseband signal that is sourced from a near perfect reconstruction filterbank (NPRFB). The digital signal is upsampled to provide a plurality of spectral images or copies of the complex baseband signal, such that one of the spectral images is centered at an intermediate frequency (IF). The plurality of spectral images is then filtered to provide a spectral image centered at IF. The real portion of the spectral image centered at IF is extracted and provided to a high speed digital-to-analog converter (DAC) to convert the spectral image centered at IF to an IF analog signal. The IF analog signal can then be modulated or further mixed with a RF frequency transmission signal for RF transmission with low distortion. The spectral image centered at IF is input into the DAC in the flat frequency response region of the DAC providing an IF analog signal with low distortion. This low distortion scheme is efficient in terms of digital computation and requires no extra analog hardware.

In one aspect of the present invention, a digital complex baseband signal is upsampled in the digital domain to provide a plurality of spectral images centered at different frequencies. The upsampled signal is interpolated with a complex tap digital filter, such the spectral image centered at IF is extracted and the other spectral images are rejected. In another aspect of the present invention, a real filter is employed to filter off the spectral image centered at complex baseband and a multiplier mixed with the spectral image centered at complex baseband to shift the spectral image to be centered at IF. In either aspect of the invention, the complexity of the filter can be reduced by providing an oversampled signal, for example, from a NPFRB. Since the reconstructed signal is bandlimited and oversampled, the upsampling of the images result in further separation in frequency allowing a filter with more gradual rolloff. Once upsampled and filtered, the signal can be input in the flat frequency response range of a high speed DAC.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF INVENTION

The present invention relates to a system and method for efficient analog reconstruction of a digital signal. The digital signal can be sourced from a near perfect reconstruction filterbank (NPRFB). The output of the NPRFB, after some manipulation in the digital domain, is converted to the analog domain at IF. The IF analog signal can then be modulated with a high frequency RF signal or further mixed with a RF transmission frequency signal for RF transmission. The system and method employ a high speed DAC to convert the digital signal centered at IF to an IF analog signal with low distortion. A high speed DAC is a DAC with an accurate bandwidth that is closer to the IF or transmission frequency than the processing frequency.

In one aspect of the invention, the digital signal is an output of an NPRFB. The output of the NPRFB can be an oversampled, complex baseband signal. Depending on the type of NPRFB employed, an oversampled output can be accomplished through various means. The digital complex baseband output of the NPRFB is then digitally upsampled. The upsampling produces spectral images of the signal in the frequency domain in which one of the signals is centered at IF. If the signal is oversampled before it is upsampled, the spectral images of the upsampled signal have separation in the frequency domain. Thus, a less aggressive digital filter can be employed.

A complex digital filter can be employed to filter the spectral image centered at IF, and the real part of the result passed to the DAC. Alternatively, a filter can be employed that is comprised of a real digital filter cascaded with a digital frequency shift multiplier to produce a spectral image centered at IF, and the real part of the result passed to the DAC.

Figure 1:
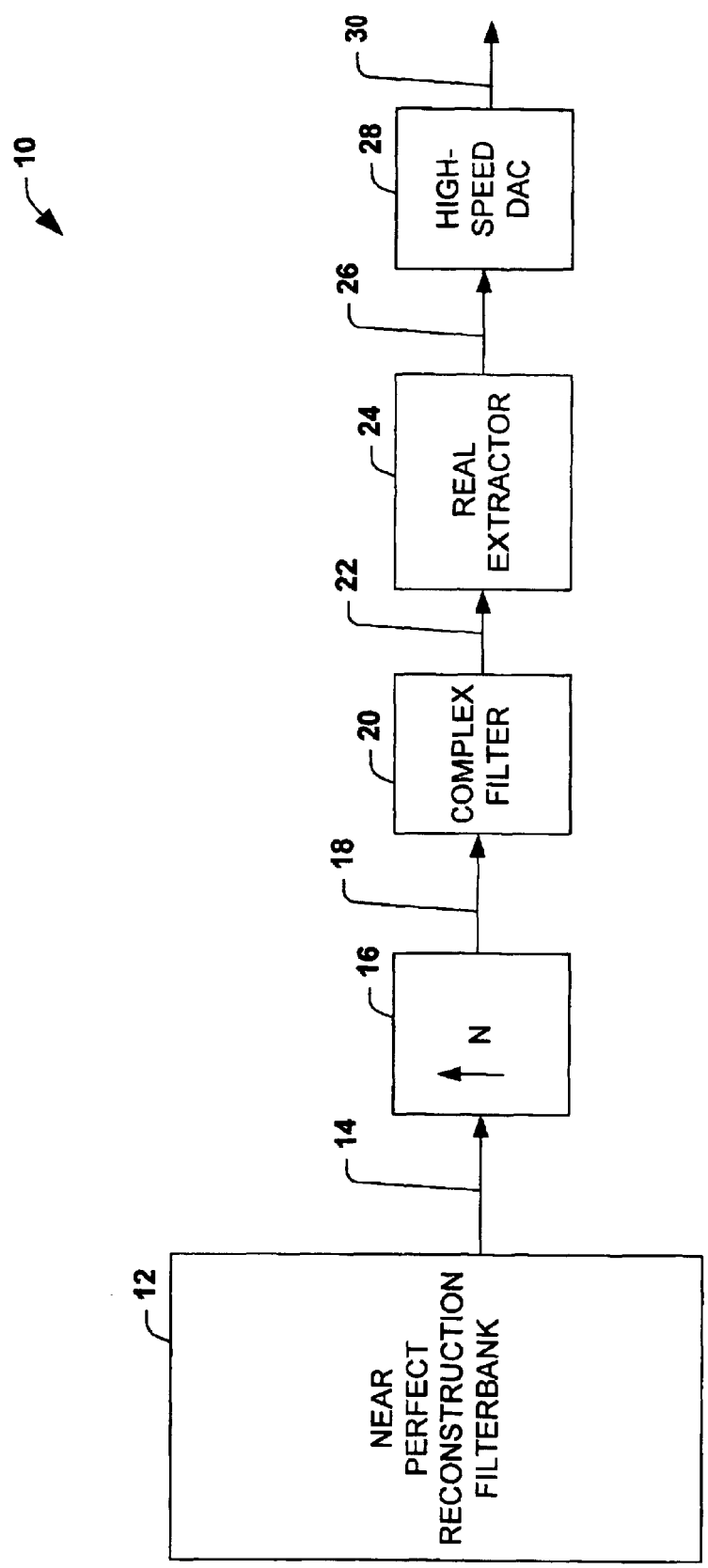
FIG. 1 illustrates a block diagram of a system for analog reconstruction of a digital signal to an IF analog signal in accordance with an aspect of the present invention.

FIG. 1 illustrates a system 10 for analog reconstruction of a digital signal sourced from a NPRFB 12 in accordance with an aspect of the present invention. It is to be appreciated that the digital signal can be sourced from other devices. Additionally, the signal can be a simple or complex signal and be comprised of a single or plurality of subbands. The system 10 converts an oversampled, complex wideband digital signal centered at the baseband frequency to a wideband analog signal at IF without employing a separate analog mixer device. The wideband analog signal at IF can then be modulated onto a RF carrier frequency at an RF transmission frequency or further mixed with a RF transmission frequency for RF transmission.

The system 10 includes the NPRFB 12 that provides an oversampled, complex baseband digital signal at an output 14. The NPRFB 12 can be operative to receive a wideband digital signal having a plurality of subbands or subchannels, break the wideband signals into the plurality of subbands, for example, employing an analysis filterbank portion, sort or shift the subbands to different frequency bands or different frequency band locations, and reconstruct the shifted subbands Into a modified wideband digital signal, for example, employing a synthesis filterbank portion. Alternatively, the oversampled NPRFB 12 can receive a plurality of frequency subband digital signals from a central controller or processor and reconstruct the plurality of subbands into an oversampled, complex wideband signal. A plurality of different NPRFB 12 types can be employed to provide an oversampled complex wideband signal at 14.

The oversampled, complex wideband signal is centered at a baseband frequency. The baseband frequency is a frequency that facilitates processing and is generally slower than the RF transmission frequency. The oversampled, complex wideband digital signal centered at baseband is provided at the output 14 of the NPRFB 12. The oversampled output can be provided by employing a NPRFB that employs R inputs for a set of M subbands, where R is greater than M and R and M are integers greater than zero. It is to be appreciated that the M subbands can be oversampled by an integer rate or a non-integer rate. For example, the M subbands can be provided to M inputs, while M-R inputs are zero stuffed or loaded. The M inputs and M-R zero valued inputs are reconstructed to result in an RIM oversampled output at 14.

Figure 2:
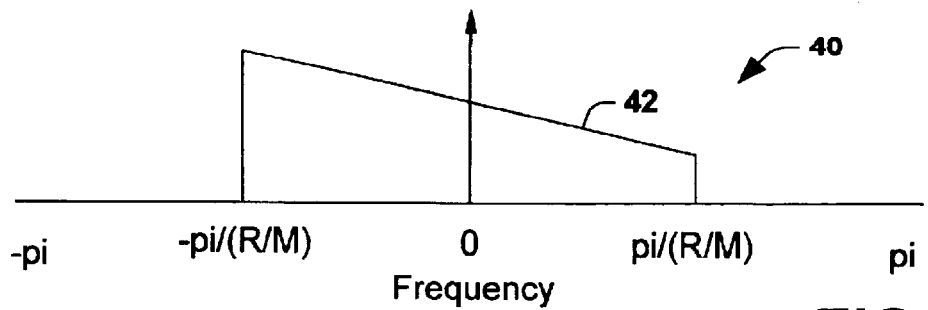
FIG. 2 illustrates a graph of output amplitude versus frequency of an output of the NPRFB of FIG. 1.

FIG. 2 illustrates a graph 40 of output amplitude versus frequency of the oversampled, complex wideband digital signal 42 at the output 14 of the NPRFB 12, where pi is the sampled output range at the Nyquist frequency and R/M is the ratio of number of inputs/number of subbands. As illustrated in FIG. 2, the complex baseband signal 42 has no frequency content from pi/(R/M) to pi and –pi/(R/M) to –pi, such that the oversampled output extends from –pi/(R/M) to pi/(R/M). For example, if the number of subbands where eight and the number of inputs to the NPRFB 12 where sixteen, then R/M would be equal to two. Therefore, if the Nyquist frequency was 100 KHz, the oversampled signal would only have a frequency content from –50 KHz to 50 KHz, and there would be no frequency content from –50 KHz to –100 KHz and 50 KHz to 100 KHz.

The oversampled, complex wideband digital signal centered at baseband provided at the output 14 of the NPRFB 12 is then upsampled by an upsampling component 16 by an upsampling factor N, where N is an integer greater than zero. The upsampling of the oversampled complex wideband digital signal produces spectral images or copies of the signal in the frequency domain centered at integer multiples of pi/N where N is selected to provide one of the integer multiples to be centered at IF. The oversampled output produces a guard band between the transition regions of the subbands of the compex wideband digital signal upon upsampling. Therefore, a simpler digital complex filter can be employed to extract the IF signal of the complex wideband signal. The upsampling provides a plurality of higher frequency rate signals as k/N multiples of the output at the Nyquist frequency (pi) including one signal centered at the IF frequency where k is the integer multiple of the IF and N is the upsampling rate. The upsampling component 16 can upsampled by zero loading the baseband output 14 of the NPRFB 12 or by employing some other windowing method (e.g., boxcar window) to upsample the baseband output.

The plurality of spectral images are provided at an output 18 of the upsampling component 16, which is provided as input to a complex digital filter 20. The complex digital filter 20 retains the signal image that is centered at the IF frequency. The complex digital filter 20 can be constructed using either Finite Impulse Response (FIR) or Infinite Impulse Response (IIR) filter design techniques.

Figure 3:
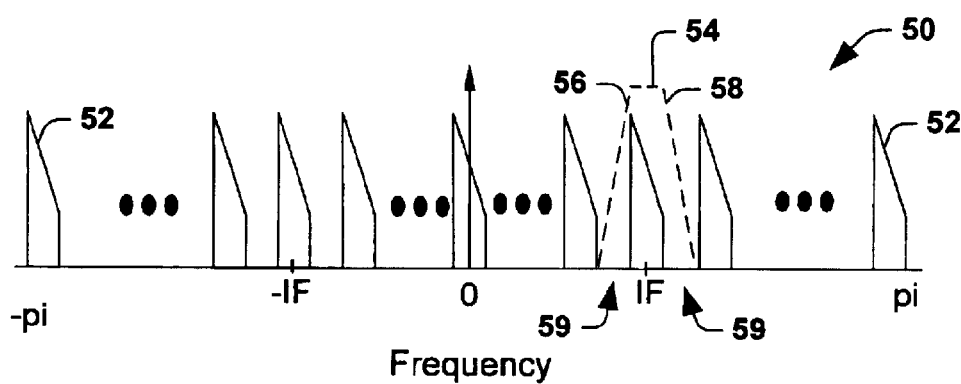
FIG. 3 illustrates a graph of output amplitude versus frequency of the plurality of upsampled images of the output of the NPRFB of FIG. 1.

FIG. 3 illustrates a graph 50 of output amplitude versus frequency of the plurality of upsampled spectral images 52 at 18. The plurality of upsampled spectral images 52 include a plurality of higher frequency rate signals as k/N multiples of the output at the Nyquist frequency pi, k is the integer multiple for the IF and IF is equal to k*pi/N an −IF is equal to −k*pi/N. As illustrated in FIG. 3, a complex digital filter has a filter response 54 illustrated by the dotted lines that extracts the complex wideband signal centered at IF. The filter response 54 illustrated by the dotted lines has transition bands 56 and 58. Those skilled in the art would appreciate that a digital filter with transition bands is a much simpler filter to design than a filter with a filter response that does not have transitions bands (e.g., square filter response). The simpler complex filter can be employed since the spectral images have guard bands 59 that are generated due to the oversampled output 14 provided by the NPRFB 12.

Referring again to FIG. 1, a complex wideband signal centered at IF is provided at an output 22 of the complex filter 20. A real extractor 24 then extracts the real portion of the complex wideband signal centered at IF to provide a wideband signal centered at IF at an input 26 of a high speed DAC 28. The rate of the signal passing through the DAC is equal to the processing frequency times the upsampling rate N. The real portion of the wideband signal centered at IF is provided to the high speed DAC 28. The high speed DAC 28 converts the real portion of the wideband signal centered at IF from a digital signal to an IF analog signal. The IF analog signal can then be modulated onto a RF carrier at an RF transmission frequency or further upmixed with an RF transmission frequency signal for RF transmission.

Figure 4:
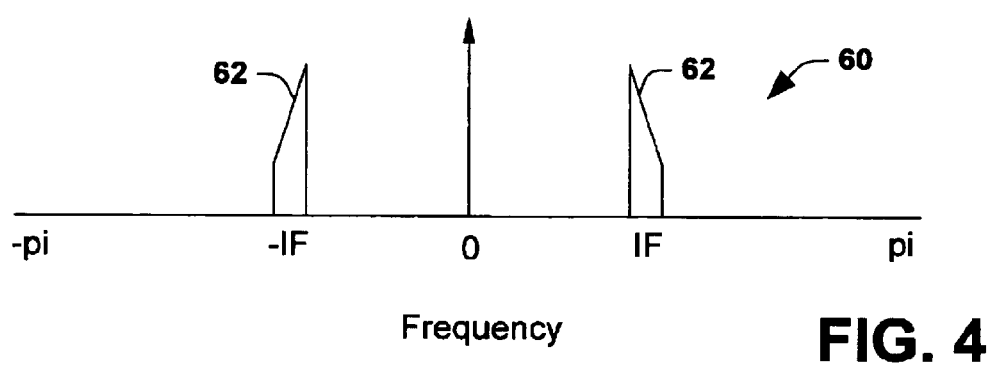
FIG. 4 illustrates a graph of output amplitude versus frequency of a real portion of an output of the complex filter of FIG. 1.
Figure 5:
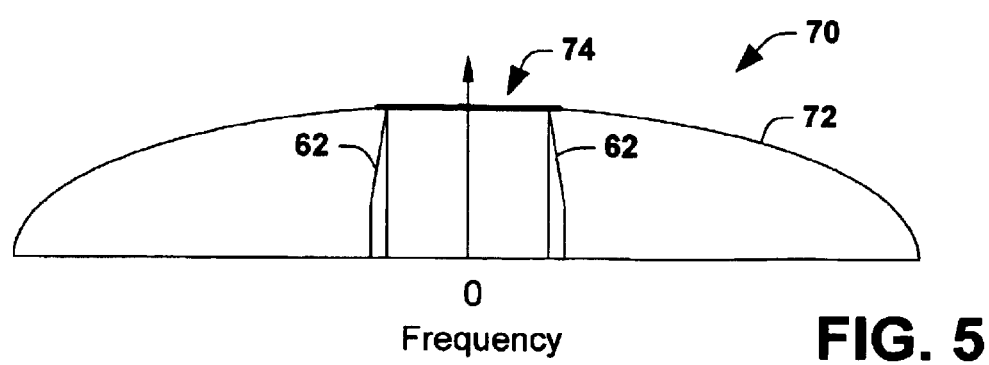
FIG. 5 illustrates a graph of output amplitude versus frequency of the wideband signal centered at IF within a flat portion of a DAC frequency response of the high speed DAC of FIG. 1.

FIG. 4 illustrates a graph 60 of output amplitude versus frequency of the real portion of the complex wideband signal 62 centered at IF. The wideband signal 62 centered at IF includes a positive portion equal to k*pi/N and a negative portion −IF equal to −k*pi/N where k is an integer multiple of the output at the Nyquist frequency (pi) associated with the IF, divided by the upsampling rate (N). FIG. 5 illustrates a graph 70 of output amplitude versus frequency of the wideband signal 62 centered at IF within a DAC frequency response 72. The DAC frequency response 72 includes a flat portion or flat response region 74 that is the accurate bandwidth region of the DAC and a curved portion that is outside the accurate bandwidth region of the DAC. The wideband signal centered at IF 62 resides within the flat portion 74 of the DAC response 72 since the IF is still low relative to the sampling frequency of the DAC. In general, the flat portion 74 of the DAC response 72 is more accurate than the non-flat region of the DAC response. Since the DAC response is a known parameter of a DAC, a high speed DAC can be selected so that the IF resides in the flat portion of the DAC response.

Figure 6:
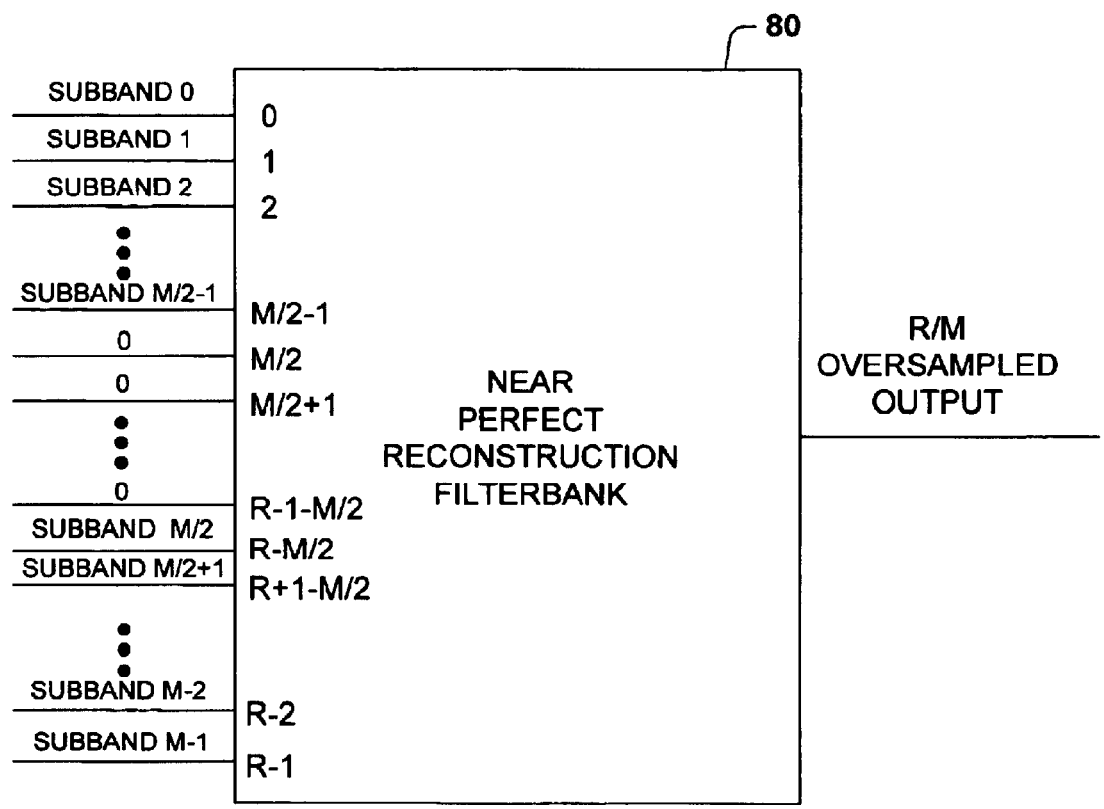
FIG. 6 illustrates a block diagram of an exemplary NPRFB in accordance with an aspect of the present invention.

FIG. 6 illustrates an exemplary NPRFB 80 in accordance with an aspect of the present invention. The output of the NPRFB 80 is an oversampled, complex baseband signal. Depending on the type of reconstruction filterbank employed, an oversampled output can be accomplished through various means. In the exemplary NPRFB 80 of FIG. 6, the NPRFB 80 includes R inputs and receives M subbands where R and M are integers and R is greater or equal than M. The R inputs include input channels 0 through M/2-1, which receive subband 0 to subband M/2-1 signals, respectively. The R inputs also include input channels M/2 through R-1-M/2 which are zero loaded or zero stuffed. The R inputs also include channels R-M/2 through R-1 which receive subband R-M/2 to subband R-1 signals, respectively. The M inputs and M-R zero valued inputs are reconstructed to result in an R/M oversampled output. For example, if the number of subbands M where eight and the number of inputs R to the NPRFB 80 where sixteen, then R/M would be equal to two and the oversampled output would have a frequency range that is one-half of the frequency that would be provided at the Nyquist frequency pi.

Figure 7:
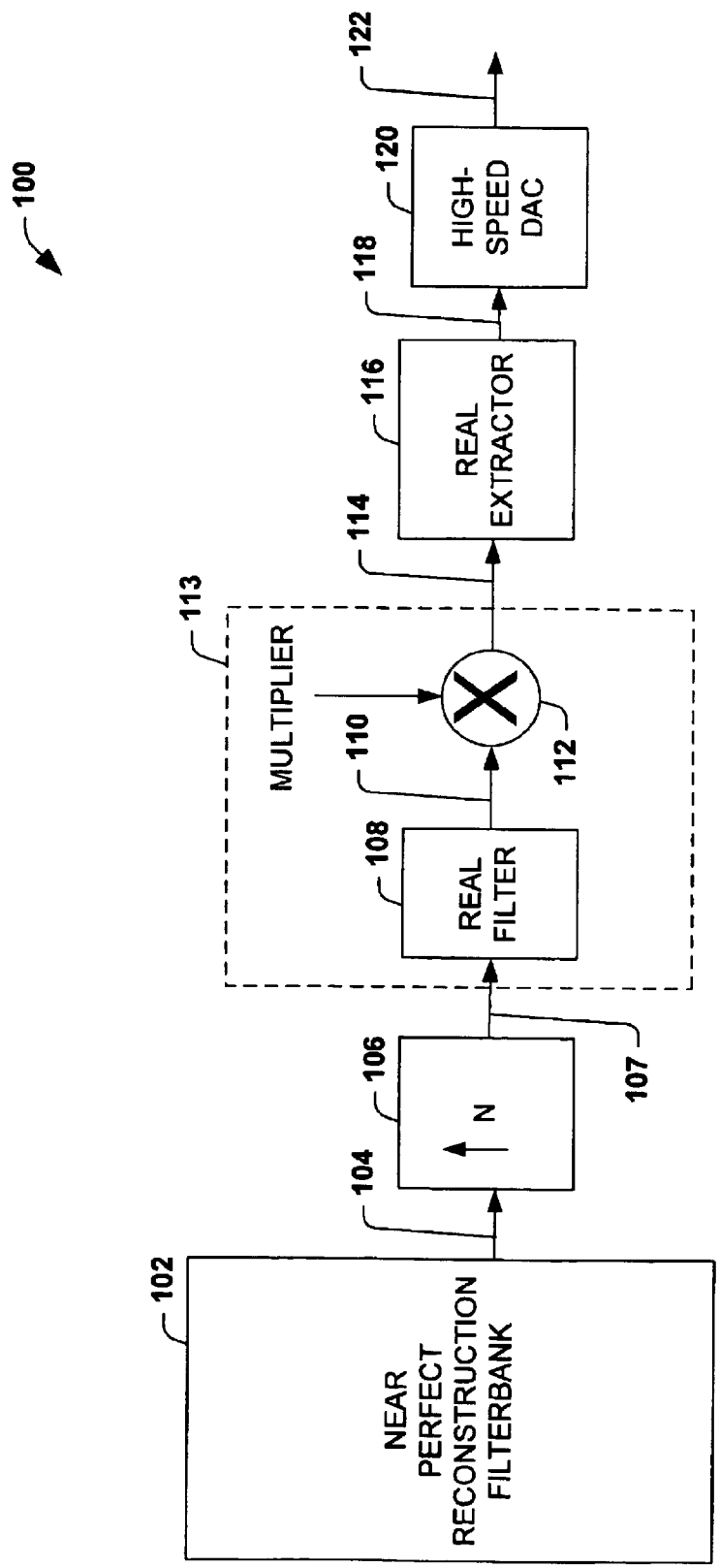
FIG. 7 illustrates a block diagram of a system for analog reconstruction of a digital signal to an IF signal in accordance with another aspect of the present invention.

FIG. 7 illustrates a system 100 for analog reconstruction of a digital signal to an IF analog signal in accordance with another aspect of the present invention. The system 100 employs a real filter 108 in place of the complex filter 20 illustrated in FIG. 1. The system 100 includes an oversampled NPRFB 102 that provides an oversampled, complex baseband digital signal at an output 104. The oversampled, complex wideband signal is centered at a baseband frequency. The baseband frequency is a frequency or frequency range that facilitates processing and is generally slower than the transmission frequency range. The system 100 converts the oversampled, complex wideband digital signal centered at the baseband frequency to a wideband analog signal centered at IF without employing a separate analog mixer device.

The oversampled, complex wideband digital signal centered at baseband provided at the output 104 of the NPRFB 102 is then upsampled by an upsampling component 106 by an upsampling factor N. The upsampling of the oversampled complex wideband digital signal produces spectral images of the signal in the frequency domain centered at integer multiples of the output at the Nyquist frequency (pi) divided by the upsampling factor (N) similar to that illustrated in FIG. 3. The upsampling provides a plurality of higher frequency rate signals including one signal centered at the IF frequency. The plurality of spectral images are provided at an output 107 of the upsampling component 106, which is provided as input to a filter 113. The filter 113 is comprised of a real digital filter 108 and a mixer 112 that mixes a multiplier to shift the spectral image centered at baseband to be centered at IF. The real filter 108 extracts and provides the complex wideband signal image that is centered at baseband at an output 110 of the real filter 108. The output 110 of the real filter 108 is then mixed with a multiplier via a mixer 112 that shifts the frequency of the signal image from being centered at baseband to being centered at IF.

The multiplier in FIG. 7 can be equal to the exp (j*2 π*f*t) where f is the IF and t is the time interval of the input signal. Alternatively, the multiplier can be a cosine multiplier. An output 114 of the mixer 112 is then provided to a real extractor 116. The real extractor 116 then extracts the real portion of the complex wideband signal centered at IF to provide a wideband signal centered at IF at an input 118 of a high speed DAC 120. The high speed DAC 120 converts the wideband signal centered at IF from a digital signal to an analog signal which is provided at an output 122 of the DAC 120. The wideband signal centered at IF resides within a flat portion of the DAC frequency response of the DAC 120, similar to that illustrated in FIG. 5.

It is to be appreciated that the NPRFBs, the upsampling components, the filters, the multiplier and the real component extractors illustrated in FIG. 1 and FIG. 7 can be implemented as hardware, software or a combination of hardware and software. Alternatively, the NPRFBs, the upsampling components, the filters, the multiplier and the real component extractors can be implemented as one or more algorithms executed on one or more digital signal processors (DSPs). The NPRFB, the upsampling components, the filters, the multiplier and the real component extractors provide processing of the wideband signal in the digital domain, therefore simplifying the functionality of many of the components associated with transmitting a wideband signal over a RF link.

Figure 8:
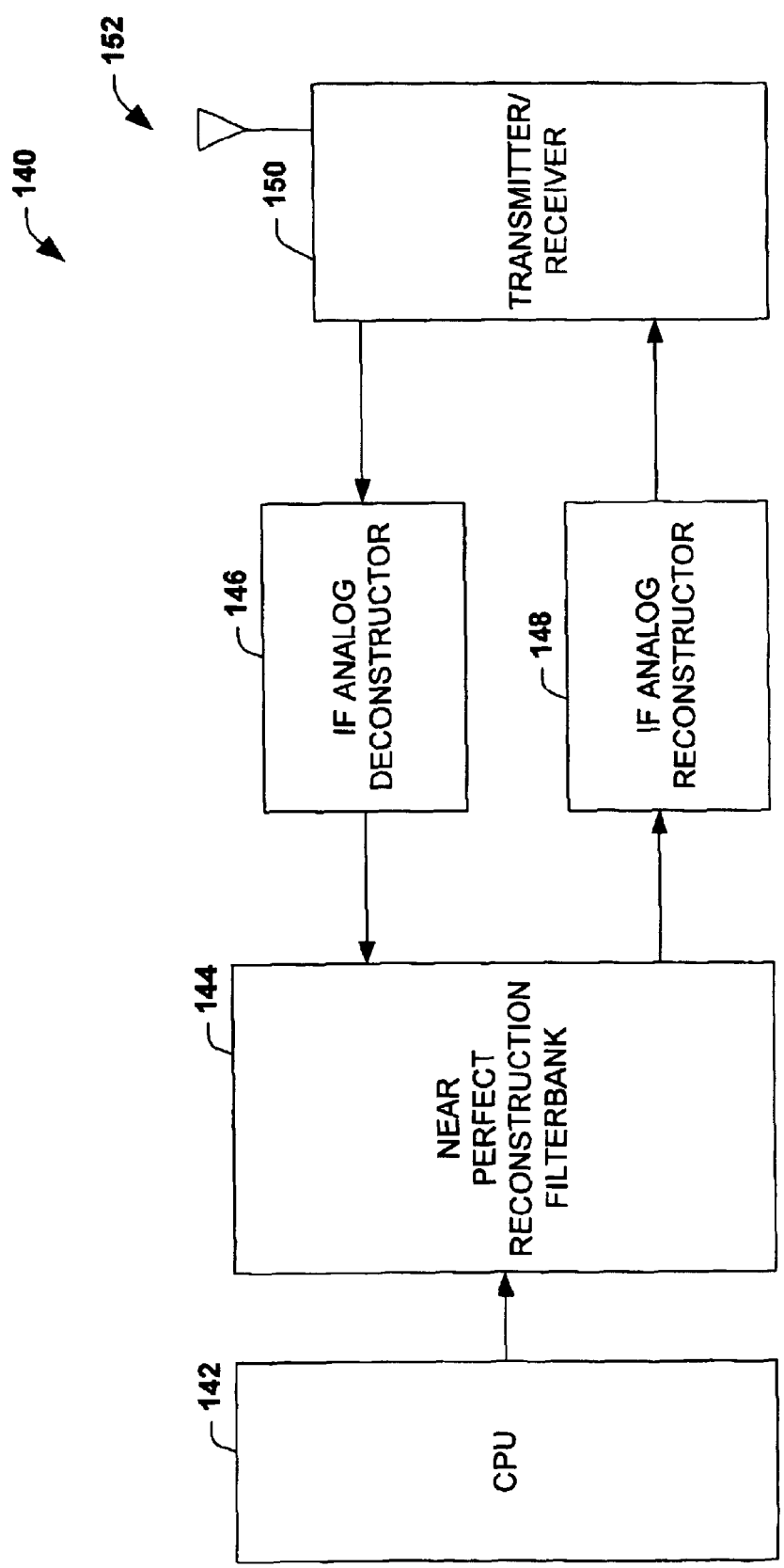
FIG. 8 illustrates a block diagram of a transceiver that employs an IF analog reconstructor in accordance with an aspect of the present invention.

FIG. 8 illustrates a transceiver 140 that employs a direct analog IF reconstructor 148 in accordance with an aspect of the present invention. The direct analog IF reconstructor 148 includes similar upsampling components, filters, real component extractors and high speed DACs as illustrated in the systems of FIG. 1 and FIG. 7. The transceiver 140 can be, for example, part of a satellite or terrestrial base station device. The transceiver 140 includes a transmitter/receiver component 150 having an antenna 152 for receiving and transmitting RF transmission signals. The transmitter/receiver component 150 receives wideband RF transmission signals and provides the wideband RF transmission signals to an IF analog deconstructor 146. The IF analog deconstructor 146 converts the RF transmission signal from the analog domain to the digital domain and down mixes the RF transmission signal to a first intermediate frequency signal centered at a complex baseband frequency for processing of the signal. The wideband complex digital signal is provided to a NPRFB 144.

The NPRFB 144 includes an analysis portion that filters the wideband digital signal into a number of subbands. The subbands are then provided to a central processor unit 142. The central processor unit 142 can process the subbands, resort the subbands based on a transmission order or protocol and provide the resorted or reordered subbands back to the NPRFB 144.

The NPRFB 144 includes a synthesis portion that recombines the subbands to provide a digital complex wideband signal centered at baseband. The inputs to the NPRFB 144 include the subband inputs and inputs that are stuffed or loaded with zeroes to provide an oversampled complex wideband signal centered at baseband. The oversampled complex wideband digital signal centered at baseband is provided to the IF analog reconstructor 148. The IF analog reconstructor 148 converts the oversampled complex wideband digital signal centered at baseband to an IF analog signal for RF transmission. The IF analog reconstructor 148 upsamples the oversampled complex wideband digital signal centered at baseband to provide a plurality of spectral images centered at multiples of the IF signal. The IF signal is then extracted via a filter and the real portion of the IF signal provided to a high speed DAC within a flat response region of the high speed DAC. The high speed DAC then converts the real portion of the wideband signal centered at IF into an IF analog signal. The transmitter/receiver 150 then transmits the IF analog signal through the antenna 152.

Figure 9:
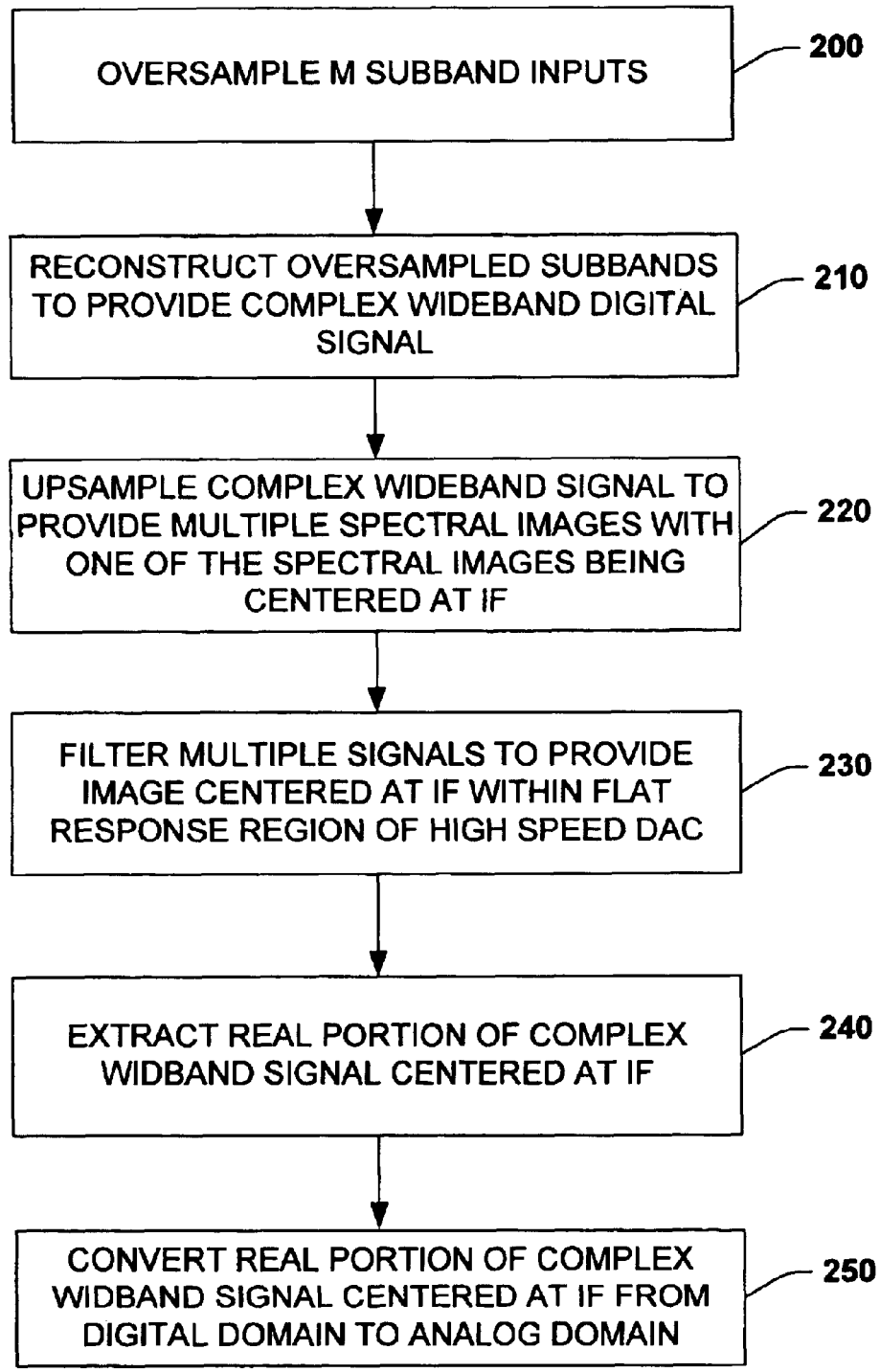
FIG. 9 illustrates a methodology for efficient analog reconstruction of a digital signal to an IF analog signal in accordance with an aspect of the present invention.

In view of the foregoing structural and functional features described above, a methodology in accordance with various aspects of the present invention will be better appreciated with reference to FIG. 9. While, for purposes of simplicity of explanation, the methodology of FIG. 9 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 9 illustrates a methodology for efficient analog reconstruction of a digital signal to an IF analog signal in accordance with an aspect of the present invention. The methodology begins at 200 where M subband inputs are oversampled by providing the M subband inputs to a NPRFB with R inputs where M and R are integers greater than zero and R is greater than M. The additional R-M inputs can be loaded with zero to provide an oversampled complex wideband digital signal. At 210, the oversampled subbands are combined and reconstructed by the NPRFB to provide an oversampled complex wideband digital signal. It is to be appreciated that other methodologies can be employed to provide an oversampled complex wideband digital signal. At 220, the oversampled complex wideband digital signal is then upsampled to provide multiple spectral images or copies of the oversampled complex wideband digital signal centered at integer multiples of the output at the Nyquist frequency (pi) divided by the upsampling rate N, where one of the integer multiplies is centered at IF. At 230, the multiple spectral images are filtered to provide the spectral image centered at IF within the flat portion or region of the frequency response of a high speed DAC.

For example, the multiple spectral images can be filtered employing a complex filter that filters the multiple spectral images to provide a complex wideband digital signal centered at IF. Alternatively, the multiple spectral images can be filtered employing a real filter that filters the multiple spectral images to provide a complex wideband digital signal centered at baseband. The complex wideband digital signal centered at baseband can then be mixed with a multiplier such as the $\exp(j*2\pi*f*t)$ where f is the IF and t is time interval of the input signal. Alternatively, the multiplier can be a cosine multiplier. The methodology then proceeds to 240. At 240, the real portion of the complex wideband digital signal centered at IF is extracted, and provided to a high speed DAC. At 250, the real portion of the wideband signal centered at IF is converted from the digital domain to the analog domain to provide the IF analog signal. The high speed DAC and the real portion of the wideband signal centered at IF are selected such that the wideband signal centered at IF resides within a flat response or region of the DAC frequency response.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for analog reconstruction of a digital signal, the system comprising:

an upsampling component that upsamples a digital signal by an upsampling factor to provide a plurality of spectral images being integer multiples of the digital signal at the Nyquist frequency divided by the upsampling factor, one of the plurality of spectral images being centered at an intermediate frequency (IF);

a filter that filters out the spectral image centered at the IF; and a digital-to-analog converter (DAC) that converts the spectral image centered at the IF to an IF analog signal.

2. The system of claim 1, the digital signal being a complex wideband digital signal.

3. The system of claim 2, the complex wideband digital signal being oversampled and sourced from a near perfect reconstruction filterbank (NPRFB).

4. The system of claim 3, the NPFRB having R inputs for receiving M subbands, such that R-M inputs are zero loaded with R and M being integers and R being greater than M, the NPFRB providing a R/M oversampled output.

5. The system of claim 4, the oversampled output having a frequency content from pi/(R/M) to −pi/(R/M) where pi is the output response at the Nyquist frequency.

6. The system of claim 2, the filter being a complex digital filter having a filter response with transition bands.

7. The system of claim 2, further comprising a real extractor that extracts a real portion of the spectral image centered at the IF to be provided to the DAC.

8. The system of claim 2, the filter comprising a real filter that extracts the spectral image centered at baseband frequency and a multiplier mixed with the spectral image centered at baseband frequency to shift the spectral image to be centered at the IF.

9. The system of claim 8, the multiplier being exp (j*2 π*f*t) where f is the IF and t is the time interval of the input signal.

10. The system of claim 1, the DAC having a frequency response with a flat portion within the accurate bandwidth region of the DAC and a curved portion that is outside the accurate bandwidth region of the DAC, the IF being in the flat portion of the frequency response.

11. A system for converting a digital signal to an analog intermediate frequency, the system comprising:

means for upsampling a wideband digital signal by an upsampling factor to provide a plurality of spectral images being integer multiples of the wideband digital signal at the Nyquist frequency divided by the upsampling factor, one of the plurality of spectral images being centered at an intermediate frequency (IF);

means for filtering the spectral image centered at the IF; and means for converting the spectral image centered at the IF to an IF analog signal.

12. The system of claim 11, the means for filtering the spectral image centered at the IF comprising a complex digital filter.

13. The system of claim 11, further comprising means for extracting the real portion of the spectral image centered at the IF and providing the real portion to the means for converting.

14. The system of claim 11, the means for filtering the spectral image centered at the IF comprising means for filtering the spectral image centered at baseband frequency and means for shifting the spectral image centered at baseband frequency to be centered at the IF.

15. The system of claim 11, the means for converting the spectral image centered at the IF to an IF analog signal comprising a digital-to-analog converter (DAC) having a frequency response with a flat portion within the accurate bandwidth region of the DAC and a curved portion that is outside the accurate bandwidth region of the DAC, the IF being in the flat portion of the frequency response.

16. A transceiver comprising the system of claim 11.

17. The system of claim 11, further comprising means for deconstructing a received signal from a radio frequency (RF) analog signal to an IF digital signal for digital signal processing.

18. The system of claim 11, the wideband digital signal being an oversampled wideband digital signal sourced from a near perfect reconstruction filterbandk (NPRFB).

19. A method for analog reconstruction of digital signal to an intermediate frequency signal, the method comprising:

providing an oversampled wideband digital signal;

upsampling the oversampled wideband digital signal to provide a plurality of spectral images of the wideband digital signal separated by transition bands, one of the spectral images being centered at an intermediate frequency (IF);

filtering the spectral image centered at the IF; and converting the spectral image centered at the IF to an IF analog signal.

20. The method of claim 19, the providing an oversampled complex wideband digital signal being sourced from a near perfect reconstruction filterbank (NPRFB).

21. The method of claim 19, the filtering the spectral image centered at the IF comprising extracting the spectral image centered at baseband frequency and shifting the spectral image to be centered at the IF.

22. The method of claim 21, the shifting the frequency of the spectral image to be centered at the IF comprising mixing the spectral image centered at baseband frequency with a multiplier to provide a spectral image centered at the IF.

23. The method of claim 19, the converting the spectral image centered at the IF to an IF analog signal comprising providing the spectral image centered at the IF to a high speed digital-to-analog converter (DAC) having a frequency response with a flat portion within the accurate bandwidth region of the DAC and a curved portion that is outside the accurate bandwidth region of the DAC, the IF being in the flat portion of the frequency response.

24. A system for analog reconstruction of a digital signal, the system comprising:

an upsampling component that upsamples a complex wideband digital signal by an upsampling factor to provide a plurality of spectral images of the digital signal;

a real filter that the spectral image centered at baseband frequency;

a multiplier mixed with the spectral image centered at baseband frequency to shift the spectral image to be centered at an intermediate frequency (IF), the multiplier being exp (j*2 π*f*t) where f is the IF and t is the time interval of the input signal to the multiplier; and a digital-to-analog converter (DAC) that converts the spectral image centered at the IF to an IF analog signal.

25. The method of claim 20, wherein the oversampled complex wideband digital signal has a frequency content from pi/(R/M) to −pi/(R/M) where pi is the Nyquist frequency, R is the number of inputs to NPRFB, M is the number of subbands of the digital signal provided to the NPRFB, such that R-M inputs are zero loaded with R and M being integers and R being greater than M.

* * * * *